United States Patent
Hutt et al.

(10) Patent No.: US 12,050,367 B2
(45) Date of Patent: Jul. 30, 2024

(54) SPECTACLES WITH DUAL SALON AND TRADITIONAL CONFIGURATIONS

(71) Applicant: Bunny Eyez, LLC, Bethpage, NY (US)

(72) Inventors: Jennifer Hutt, Roslyn Harbor, NY (US); Stacy Fritz, Roslyn Harbor, NY (US); Andrea Gluck, Bethpage, NY (US)

(73) Assignee: Bunny Eyez, LLC., Bethpage, NY (US)

( * ) Notice: Subject to any disclaimer, the term of this patent is extended or adjusted under 35 U.S.C. 154(b) by 722 days.

(21) Appl. No.: 17/246,829

(22) Filed: May 3, 2021

(65) Prior Publication Data

US 2022/0019089 A1    Jan. 20, 2022

Related U.S. Application Data

(63) Continuation-in-part of application No. 16/207,334, filed on Dec. 3, 2018, now Pat. No. 10,996,489, which is a continuation-in-part of application No. 15/995,625, filed on Jun. 1, 2018, now Pat. No. 10,663,758, which is a continuation of application No. 29/636,664, filed on Feb. 9, 2018, now Pat. No. Des. 863,416.

(60) Provisional application No. 63/183,102, filed on May 3, 2021.

(51) Int. Cl.
G02C 5/00 (2006.01)
G02C 5/22 (2006.01)

(52) U.S. Cl.
CPC ............ *G02C 5/001* (2013.01); *G02C 5/006* (2013.01); *G02C 5/008* (2013.01); *G02C 5/2227* (2013.01)

(58) Field of Classification Search
CPC ... G02C 5/006; G02C 5/2263; G02C 2200/18
See application file for complete search history.

(56) References Cited

U.S. PATENT DOCUMENTS

| | | |
|---|---|---|
| D50,385 S | 2/1917 | Heckroth |
| D206,291 S | 11/1966 | Nordhoff |
| D208,437 S | 8/1967 | Kono |
| 4,547,048 A | 10/1985 | Negishi |
| D308,876 S | 6/1990 | Piper |
| 5,187,504 A | 2/1993 | Kanda |
| 5,229,795 A | 7/1993 | Heintzelman |
| 5,321,442 A | 6/1994 | Albanese |

(Continued)

FOREIGN PATENT DOCUMENTS

| | | |
|---|---|---|
| CN | 202563181 U | 11/2012 |
| CN | 203838428 U | 9/2014 |

(Continued)

OTHER PUBLICATIONS

Extended European Search Report Issued by the European Patent Office within EP Patent Application No. 18905601.3 on Aug. 17, 2023, 19 Pages.

(Continued)

*Primary Examiner* — Wen Huang
(74) *Attorney, Agent, or Firm* — Schott, P.C.

(57) ABSTRACT

The multiuse eyeglasses include a frame that holds two lenses and arms that extend from the frame. The arms include a first axis of rotation that is generally perpendicular to the arms and a second axis of rotation that is orthogonal to the first axis of rotation and allows the arms to be rotated downwards relative to the frame.

11 Claims, 14 Drawing Sheets

(56) References Cited

U.S. PATENT DOCUMENTS

| | | | |
|---|---|---|---|
| 5,751,393 | A | 5/1998 | Yamazaki |
| D427,227 | S | 6/2000 | Conway |
| 6,102,541 | A | 8/2000 | Kuo |
| 6,183,080 | B1 | 2/2001 | Negishi |
| 6,464,353 | B1 | 10/2002 | Spindelbalker |
| 6,719,425 | B2 | 4/2004 | Conner |
| 6,752,496 | B2 | 6/2004 | Conner |
| D492,492 | S | 7/2004 | Richard |
| 6,817,710 | B2 | 11/2004 | Benavides et al. |
| D616,484 | S | 5/2010 | Inui |
| 8,210,676 | B1 | 7/2012 | Hunt |
| 8,517,532 | B1 | 8/2013 | Hicks et al. |
| D709,122 | S | 7/2014 | Markovitz et al. |
| D718,372 | S | 11/2014 | Markovitz et al. |
| 8,992,009 | B2 | 3/2015 | Austin |
| 9,541,771 | B2 | 1/2017 | Johnson |
| 2008/0074609 | A1 | 3/2008 | Ifergan |
| 2014/0168599 | A1 | 4/2014 | Vossoughi et al. |
| 2015/0092153 | A1 | 4/2015 | Smith |
| 2016/0091731 | A1 | 3/2016 | Zhou |
| 2016/0341976 | A1 | 11/2016 | Ku |
| 2018/0095294 | A1 | 4/2018 | Johnson |

FOREIGN PATENT DOCUMENTS

| | | |
|---|---|---|
| CN | 203838432 U | 9/2014 |
| CN | 203882037 U | 10/2014 |
| CN | 204116732 U | 1/2015 |
| CN | 204241778 U | 4/2015 |
| CN | 204273511 U | 4/2015 |
| CN | 104460035 B | 6/2016 |
| CN | 105629501 A | 6/2016 |
| CN | 205333985 U | 6/2016 |
| CN | 205353475 U | 6/2016 |
| CN | 205353479 U | 6/2016 |
| CN | 205353480 U | 6/2016 |
| CN | 205353484 U | 6/2016 |
| CN | 205384413 U | 7/2016 |
| CN | 205485099 U | 8/2016 |
| CN | 205485106 U | 8/2016 |
| CN | 205512966 U | 8/2016 |
| CN | 205539771 U | 8/2016 |
| CN | 205562994 U | 9/2016 |
| CN | 205643926 U | 10/2016 |
| CN | 206892473 U | 1/2018 |
| CN | 107656378 A | 2/2018 |
| CN | 207067554 U | 3/2018 |
| CN | 207067555 U | 3/2018 |
| CN | 207133529 U | 3/2018 |
| CN | 207281396 U | 4/2018 |
| CN | 207488638 U | 6/2018 |
| JP | 11231267 A | 8/1999 |
| JP | 2006317817 A | 11/2006 |
| JP | 200147437 A | 6/2008 |
| JP | 2014-206713 A | 10/2014 |
| KR | 200400718 Y1 | 11/2005 |
| KR | 10-2009-0047255 A | 5/2009 |
| KR | 10-2010-0133625 A | 12/2010 |
| KR | 10-1041556 B1 | 6/2011 |
| KR | 10-2013-0013290 A | 2/2013 |
| KR | 10-2014-0060125 A | 5/2014 |
| WO | 2006030353 A1 | 3/2006 |
| WO | 2016/121612 A1 | 8/2016 |
| WO | 2017/003226 A1 | 1/2017 |

OTHER PUBLICATIONS

"KOO Open Cube half rim sunglasses," posted at bikerumor.com, Posting date Aug. 22, 2017, accessed at https://bikerumor.com/2017/08/22/kask-opens-koo-open-cube-half-rim-sunglasses, accessed on May 17, 2019, pp. 5.

"Nannini Compact One Optics," Posted at amazon.com, Posting date by Nov. 25, 2011, accessed at https://www.amazon.com/Nannini-Compact-Optics-Temples-Reading/dp/B006DY67DQ, accessed on May 17, 2019, pp. 10.

"Twist ONE Read Flat Folding Reading Glasses," Posted at amazon.com, Posting Date by Mar. 19, 2015, accessed at https://www.amazon.com/TWIST-Folding-Reading-Glasses-Smoke/dp/B00J85NY60, accessed on May 17, 2019, pp. 8.

"Viva7 slimfold reading glasses," Posted at global.rakuten.com, https://global.rakuten.com/en/store/viva7/item/1936005/, accessed on May 17, 2019, pp. 9.

"Welcome to Bunny Eyez," Posted at web.archive.org, Posting Date Aug. 18, 2018, http://web.archive.org/web/20180818124756/https://bunnyeyez.com/, accessed on May 17, 2019, pp. 6.

International Search Report and Written Opinion of the International Searching Authority for PCT Application No. PCT/US2018/038417 mailed on Aug. 22, 2018.

Aspex, "Eyewear group," accessed at https://aspexeyewear.com/en/catalogsearch/advanced/result/?other_technology1☐=663, accessed on Nov. 30, 2018, pp. 4.

Turboflex, EasyClip Eyewear, Published on Dec. 15, 2016, accessed at https://www.youtube.com/watch?time_continue=28&v=C1Bc2zLtYWI, accessed on Nov. 30, 2018, p. 1.

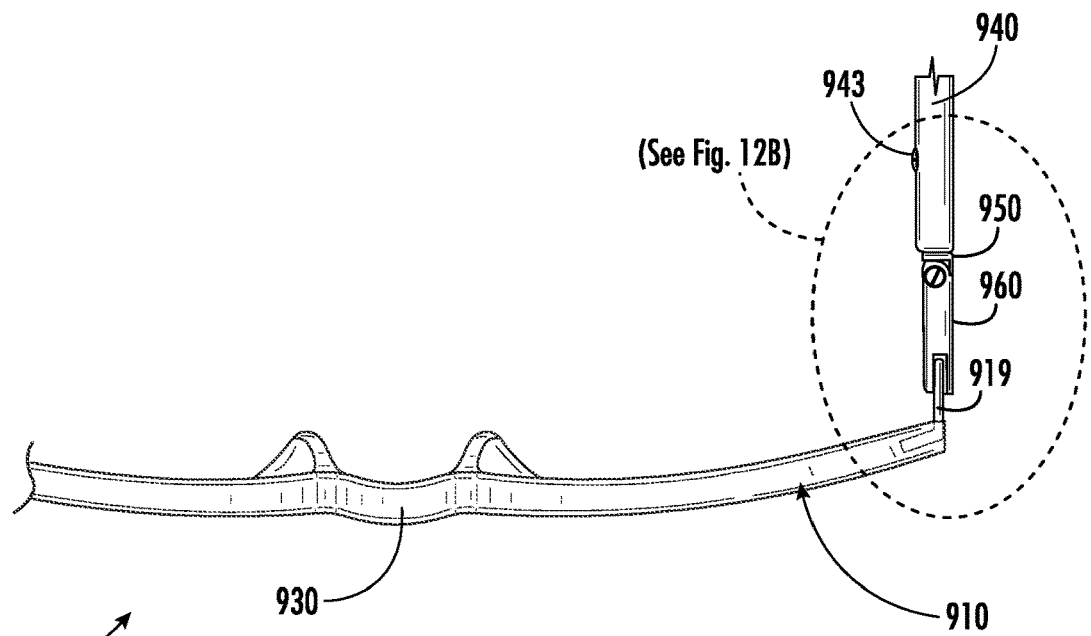
FIG. 12A
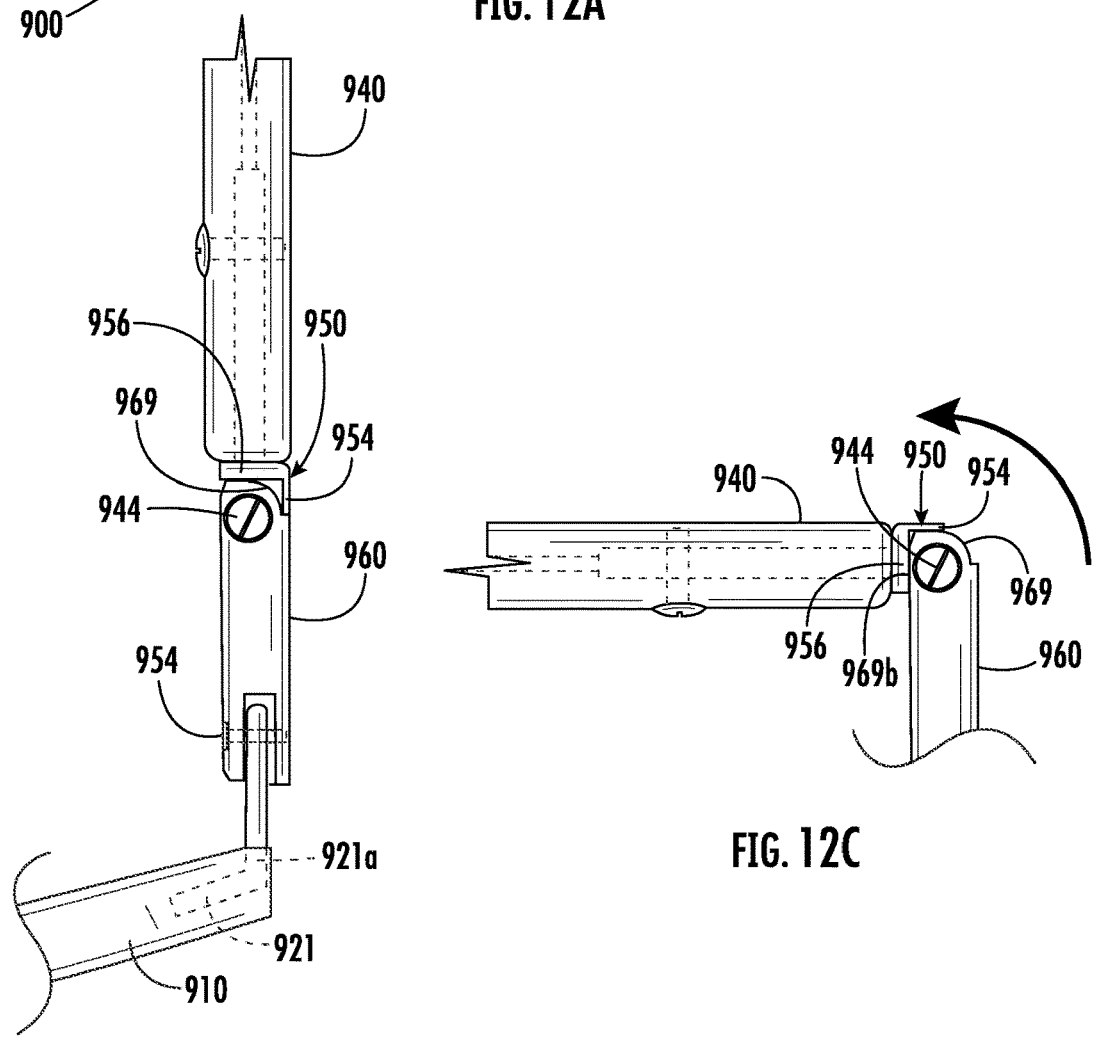
FIG. 12B
FIG. 12C

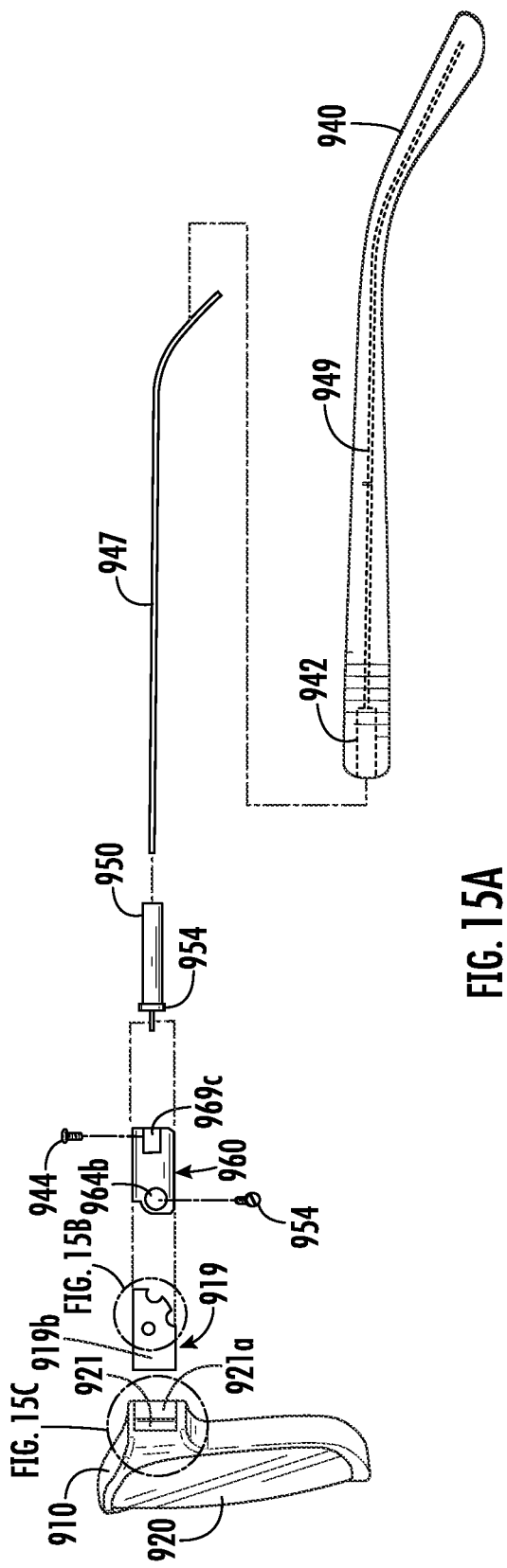
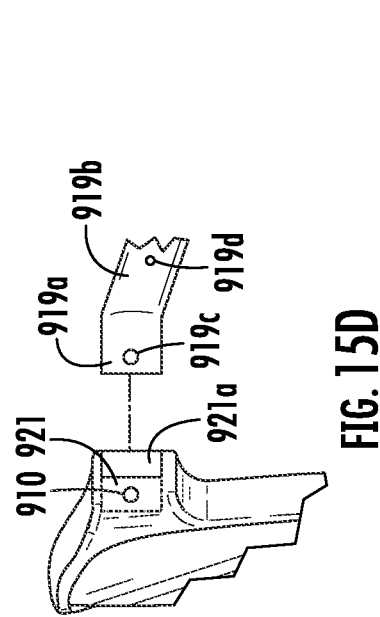
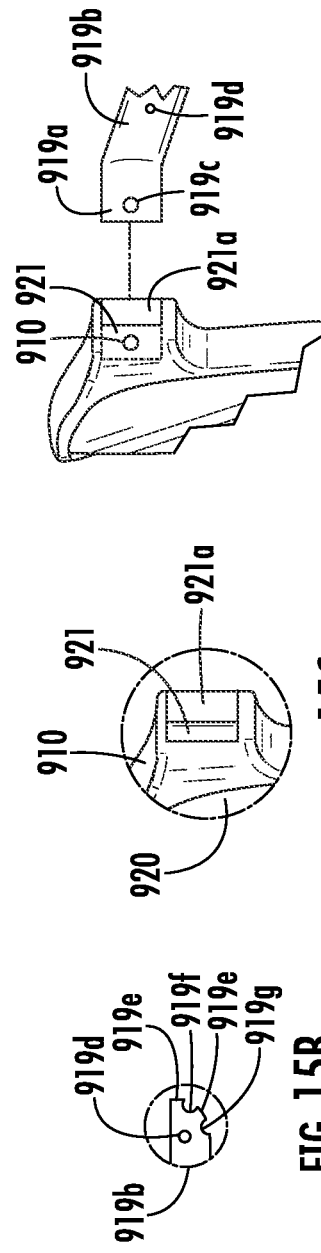
FIG. 15A
FIG. 15C
FIG. 15D
FIG. 15B

SPECTACLES WITH DUAL SALON AND TRADITIONAL CONFIGURATIONS

BACKGROUND

Traditional eyeglasses have two positions: A folded position and an extended position. FIGS. 1 and 2 show the former and FIG. 3 shows the later. The folded position is for eyeglass transportation and storage. In the extended position, the eyeglass arm earpiece loops over and behind the wearer's ear, securing the glasses to the wearer's face. This is so convenient that the design is little-changed from its early 1700s introduction by Edward Scarlett and James Ayscough, who invented eyeglass arms and their foldability respectively in 1730 and 1752.

The traditional eyeglass advantage is not only that it holds the lenses in front of the eyes while the wearer's hands are free, but it also holds the lenses in a plane in front of the wearer's eyes, allowing a user to move their eyes and retain the same optical advantage through the lenses.

One of the problems with early eyeglass designs is that as people age, they become more far-sighted and may thus lose both their ability to see near and far. Such a challenge presented a challenge to early eyeglass manufacturers, who could only produce one appropriate lens to help their wearers. As is widely known, America's famous polymath Benjamin Franklin solved this problem with his invention of the bifocals in the mid to late 1700s.

In roughly the same time period, George Adams invented the lorgnette spectacle that had no arms but instead included a handle that allowed the user to place the corrective lenses in front of their eyes in use and remove them when not. These types of glasses proved popular in theater settings and masquerades.

Each of these inventions, the traditional, the bifocal, and the lorgnette eyeglasses share certain challenges that no single eyeglass addresses. The traditional eyeglass works well but in situations where a user's ears are not accessible (during hair dying, hair drying, surgery, etc.), a person does not want to give up their ability to see and read. The bifocal (and today's progressive lenses) solve the challenge of those who want to see both near and far, but a person who wants to look over their glasses must allow the glasses to slide down their nose to look over them, in a stereotypically "disapproving teacher" pose. This way of wearing glasses down-the-nose makes them prone to falling off. Finally, the lorgnette, while stylish and functional in the hair salon, has a valuable functionality but people only call upon in certain circumstances.

Thus, there is a need for a stylish yet functional eyeglass design that solves some or all of the above challenges.

SUMMARY OF THE EMBODIMENTS

The multiuse eyeglasses include a frame that holds two lenses and arms that extend from the frame. The arms include a first axis of rotation that is generally perpendicular to the arms and a second axis of rotation that is orthogonal to the first axis of rotation and allows the arms to be rotated downwards relative to the frame.

BRIEF DESCRIPTION OF THE DRAWINGS

FIG. 12A shows a partial top view of an alternate embodiment of the multiuse eyeglasses in the traditional extended position, and FIGS. 12B and 12C show detailed views of the same in different configurations.

FIG. 15A shows a side exploded view of the alternate embodiment eyeglasses, with FIGS. 15B and 15C showing details thereof.

FIG. 15D shows a partial rear view detail of the alternate embodiment eyeglasses.

Certain dashed lines within the figures are meant to show hidden features or moving/adjustable elements, and some elements may have been shown enlarged or reduced in order to show details.

DETAILED DESCRIPTION OF THE EMBODIMENTS

Figure 1:
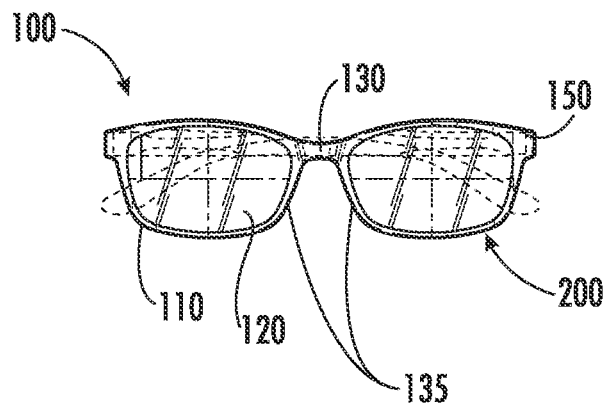
FIG. 1 shows a front elevation view of the multiuse eyeglasses in the traditional folded position.

The multiuse eyeglasses 100 described herein move between a traditional folded configuration 200 (FIGS. 1 and 2), traditional extended configuration 300 (FIGS. 3 and 4), hybrid extended configuration (500), and lorgnette (or "salon") extended configuration 600 (FIGS. 6-9). Hybrid folded and lorgnette folded configurations are also possible by folding in the arms; these configurations may be useful when attempting to fold the eyeglasses to fit into certain spaces.

Figure 3:
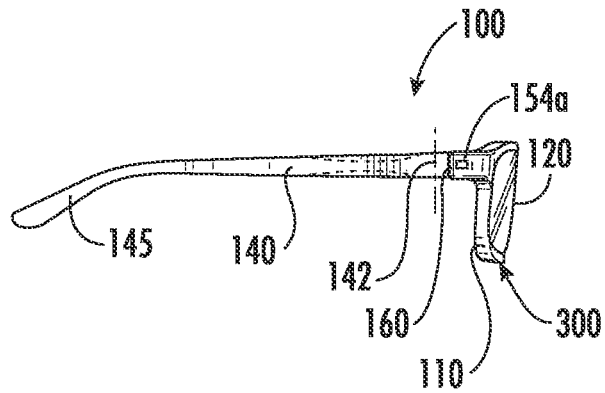
FIG. 3 shows a side view of the multiuse eyeglasses in the traditional extended position.
Figure 4:
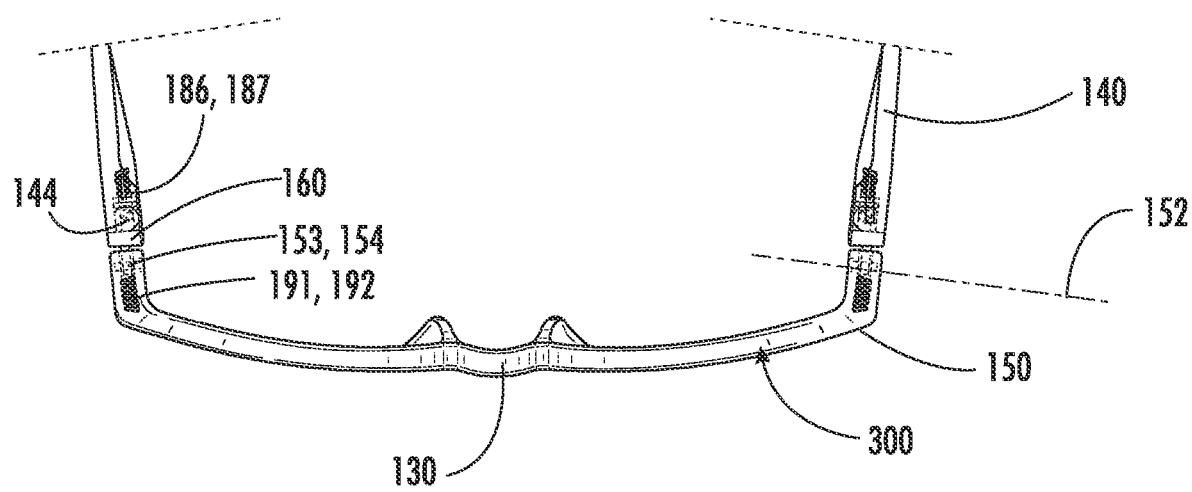
FIG. 4 shows a top view of the multiuse eyeglasses in the traditional extended position.

As best seen in FIGS. 3 and 4, the arms 140 have a first axis of rotation 142 that is generally perpendicular to the arms 140 and a second axis of rotation 152 that is orthogonal to the first axis of rotation 142 and allows the arms 140 to be rotated downwards relative to the frame 110.

With reference to all of the figures, although some figures show certain components more clearly than others, the traditional eyeglasses 100 parts are readily recognizable. The eyeglass frames 110 hold lenses 120 separated by a bridge 130 with a nosepiece 135. The eyeglass frames 110 may come in many styles and the one shown is merely for illustrative purposes and is in no way limiting to the extension of the application to other frame styles.

Arms or temples 140 attach the eyeglass frames 110 at end pieces 150. The arms 140 may have tips 145 that wrap around and behind a wearer's ear.

Figure 10:
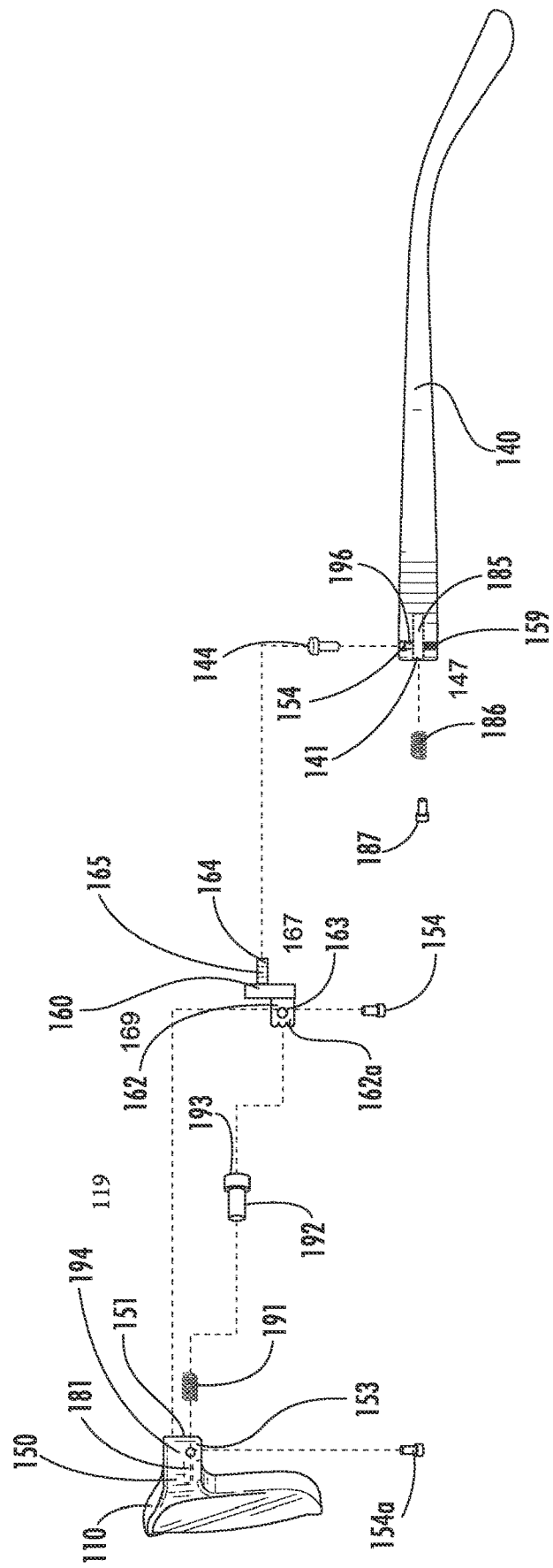
FIG. 10 shows a side exploded view of the multiuse eyeglasses, with certain attachment elements shown in profile.
Figure 11:
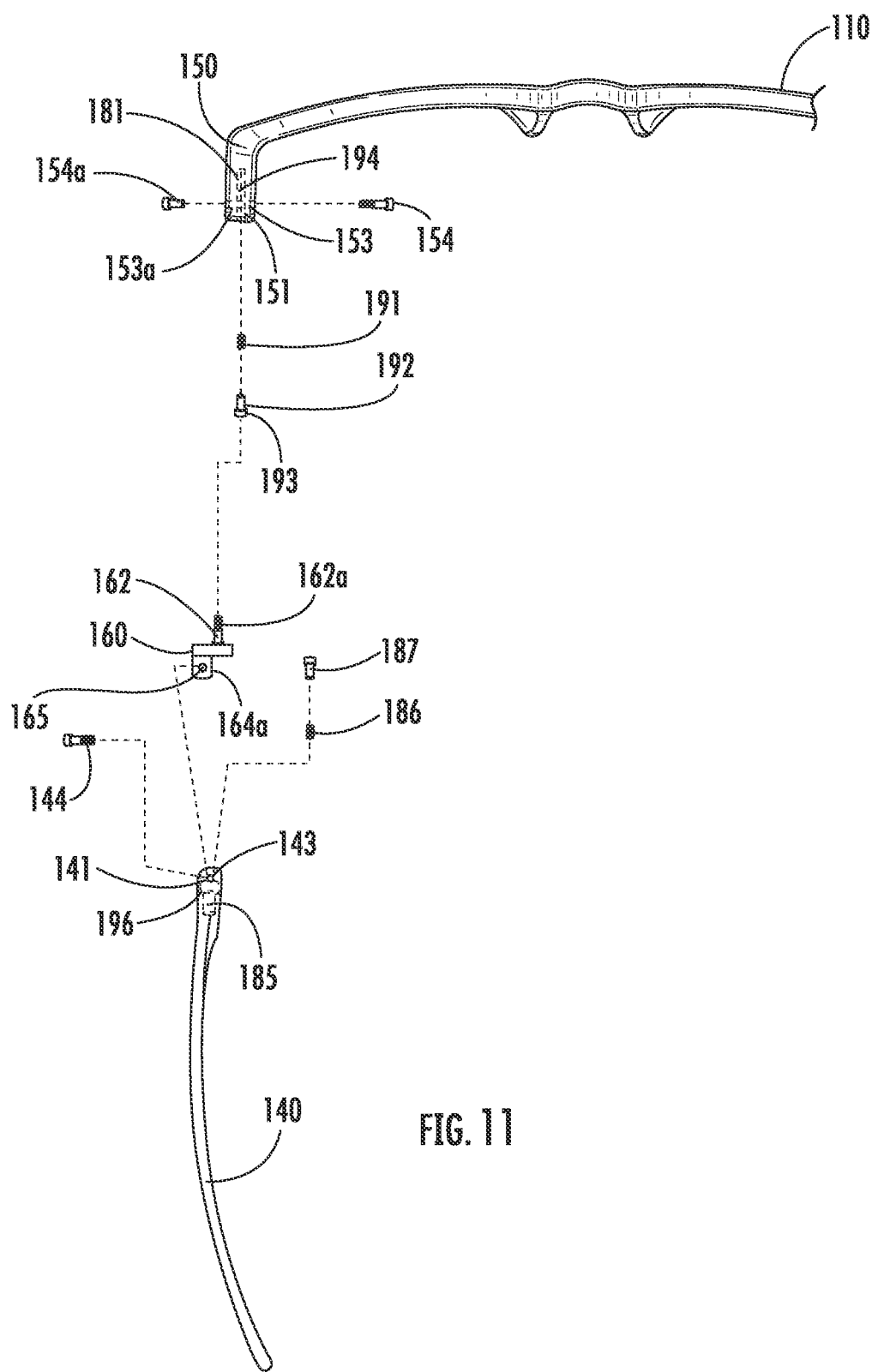
FIG. 11 shows a top exploded view of the multiuse eyeglasses, with certain attachment elements shown in profile.

The multiuse eyeglasses 100 may include a hinge element 160 that joins the frame 110 to the arms 140 and may be best appreciated in the exploded views of FIGS. 10 and 11. The hinge element 160 (shown inverted with the hinge element arm engagement portion 164 facing away from lenses 120 though it would be appreciated that when assembled, such portion 164 would be oriented further from the lenses 120 as shown in FIG. 4) may include a frame engagement portion 162 that engages the frame 110 and an arm engagement portion 164 that engages the arms 140. The hinge element 160 engages the frame 110 through a hinge receiving slot 151 that receives the frame engagement portion 162, and it engages the arms 140 through a hinge receiving channel 141 that receives the arm engagement portion 164.

The frame 110 may further include a frame pivot screw receiving hole 153 that receives a frame pivot screw 154 that defines the second axis of rotation 152 (and allows the glasses to move between the traditional and lorgnette positions). The frame pivot screw 154 may be threaded at its terminal end to engage the threading on the frame 110 or as shown, it may engage an internally threaded nut 154a.

The arms 140 may include arm pivot screw receiving holes 143 that receive arm pivot screws 144 that define the first axis of rotation 142. The arm pivot screws 144 may engage a nut or the arm pivot screw receiving holes 143 may have internal threading 159 at an end thereof to engage the screws 144.

These holes 153, 143 are best seen in the exploded views and may include a shelf 165 or 196 that engages biasing pins to be discussed hereafter.

Tracing the path of engagement of the frame pivot screw 154, the frame pivot screw 154 passes through a first portion of the frame pivot screw receiving hole 153, through a hinge element frame pivot screw receiving hole 163 and into a second portion of the frame pivot screw receiving hole 153 or the internally threaded nut 154a.

Similarly tracing the path of the arm pivot screw 144, the arm pivot screw 144 passes through a first portion of the arm pivot screw receiving hole 143, through a hinge element arm pivot screw receiving hole 165 and into a second portion of the arm pivot screw receiving hole 143 another internally threaded nut. As the arm 140 rotates about the arm pivot screw 144, its motion towards the frame 110 is free until it encounters the other folded arm 140 or the frame 110 itself in the folded configuration. Similarly, movement of the arms 140 beyond their traditional extended positions around the arm pivot screw 140 shown in FIG. 4 is prevented by contact between an arm front face 147 of the arm 140 against an arm-facing hinge face 167 of the hinge element 160 beyond which further outwards motion of the arm 140 away from the frame 110 is not possible except through bending the arm 140, frame, 110, or hinge element 160. Upwards motion of the arm 140 about the frame pivot screw 154 beyond what is shown in the extended traditional configuration of FIG. 4 is prevented by contact between a frame-facing face 169 of the hinge element 160 and a frame end face 119.

Figure 5:
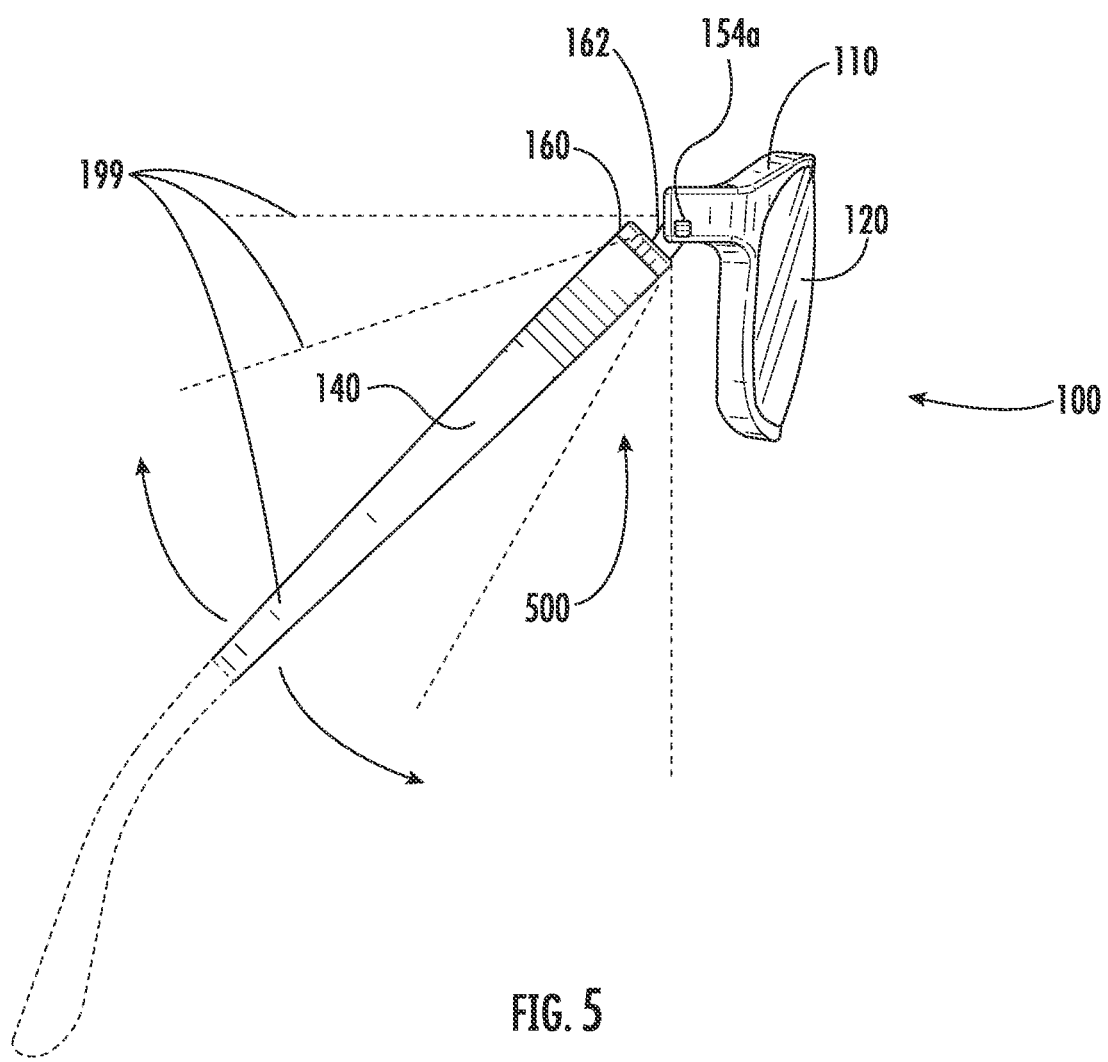
FIG. 5 shows a side view of the multiuse eyeglasses in a hybrid extended position.
Figure 6:
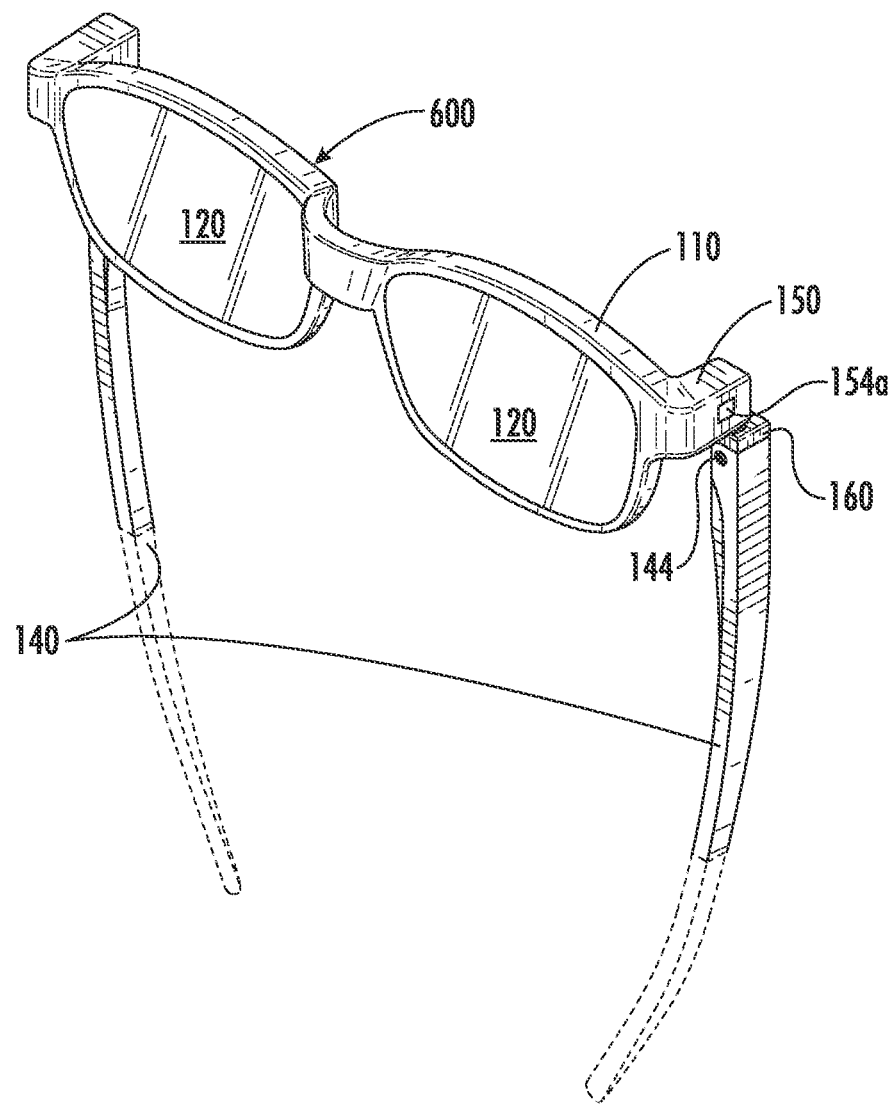
FIG. 6 shows a perspective view of the multiuse eyeglasses in a lorgnette extended position.
Figure 7:
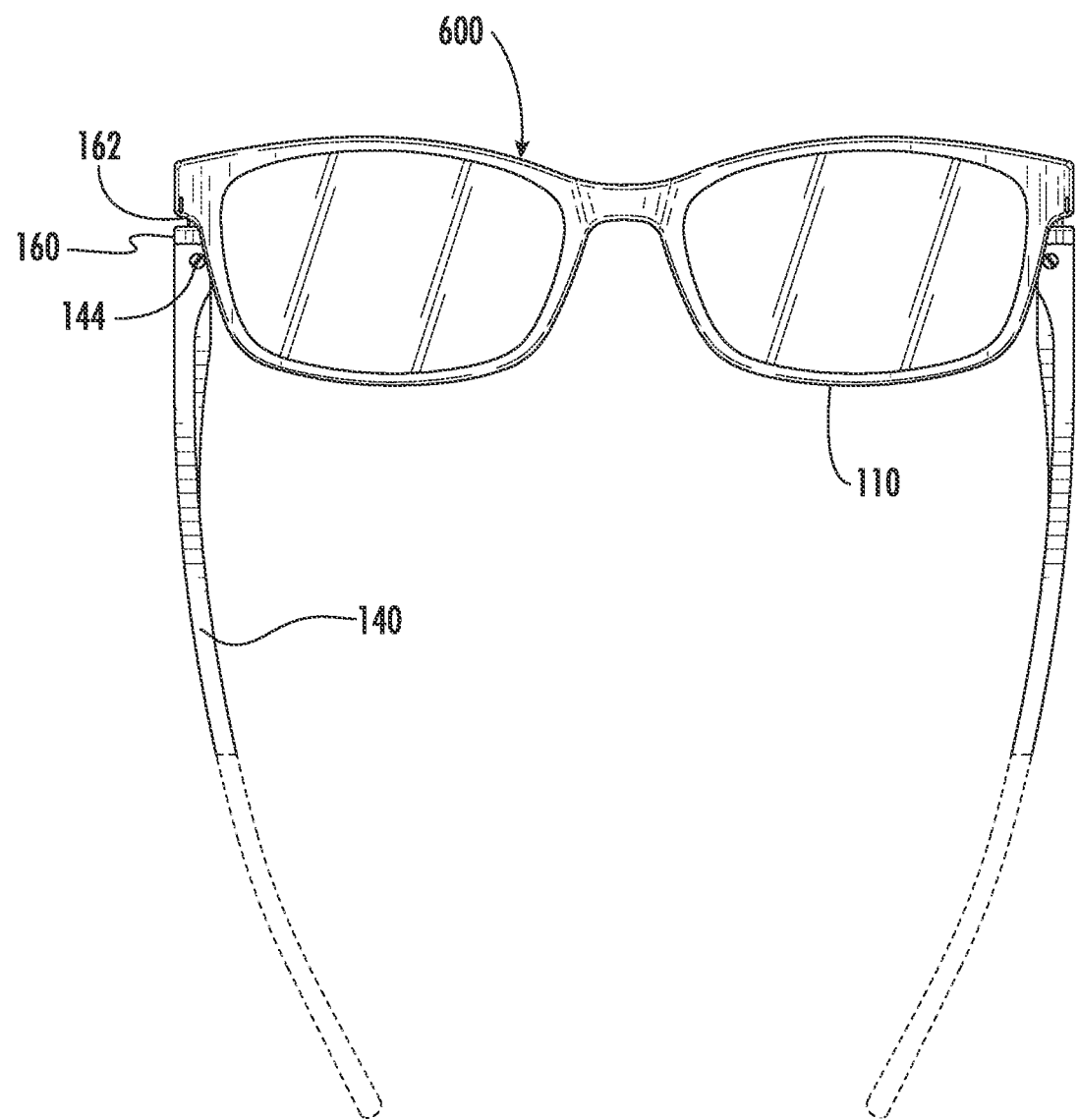
FIG. 7 shows a front view of the multiuse eyeglasses in a lorgnette extended position.
Figure 8:
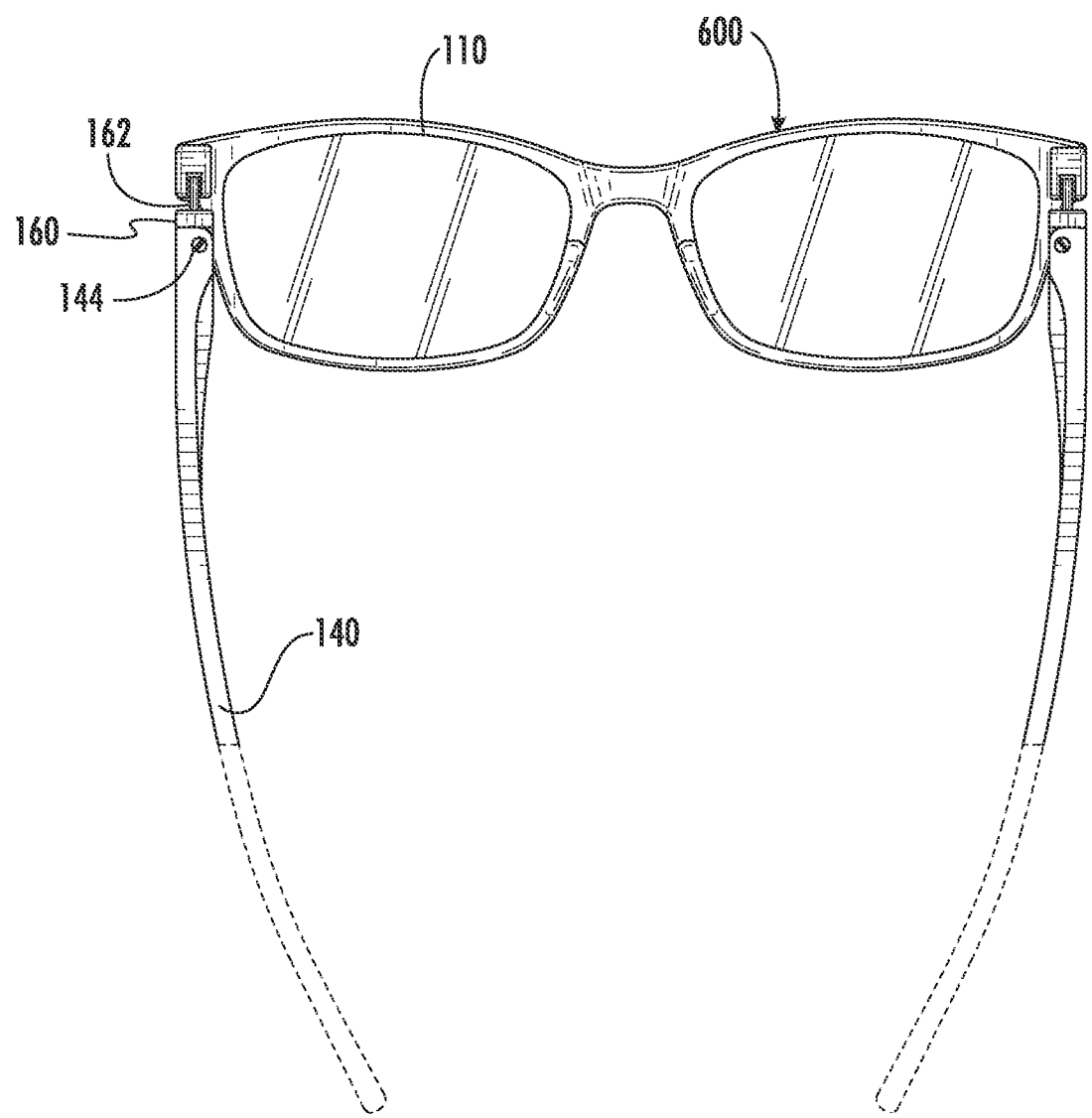
FIG. 8 shows a rear view of the multiuse eyeglasses in a lorgnette extended position.
Figure 9:
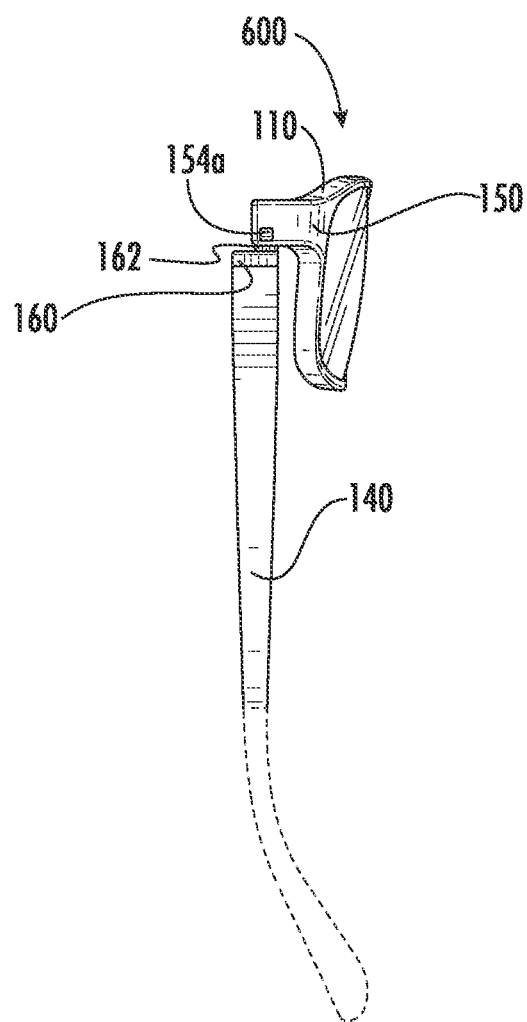
FIG. 9 shows a side view of the multiuse eyeglasses in a lorgnette extended position.

To assist in movement between distinct, i.e., not fluid movement, multiple predetermined arm positions 199 shown in phantom in FIG. 5, the hinge element frame engagement portion 162 may include teeth 162a and the frame 110 may have a frame biasing spring receiving hole 181 that receives a frame biasing spring 191 that biases a tooth engaging pin 192 with a biasing head 193. The frame biasing spring 191 biases the biasing head 193 against the hinge element's 160 teeth 162a such that the teeth 162a engage within the biasing head 193 to hold the arms in one of the multiple positions 199 about the second axis of rotation 152 and provide an audible "click" so the user knows how many clicks from the terminal traditional or lorgnette configuration they moved the arms 140 relative to the frame 110. Both hinge elements 160 for each of the arms 140 would have the same number of teeth and teeth spacing, which would ensure that the arms 140 on each side of the frame 110 would be at the same angle so the glasses wear evenly.

It should be appreciated that any angle of the arms 140 relative to the frame 110 may be possible, and not solely those that are noted when the biasing head 193 is engaged between teeth 162a. Thus, all positions of the arms 140 may be possible through their range of motion shown in FIG. 3. This allows for the wearer to tilt the frame 120 to their convenience at any angle. This all-angle possibility may be possible, and prevent the arms 140 from free movement (which would be inconvenient to the wearer, who would not want their frames freely moving during use), because the frame hinge receiving slot 151 is sized to engage the hinge element 160's frame engagement portion 162 in a press fit. This press fit holds the hinge element 160 and thus also the arms 140 relative to the frame 110 to prevent motion between therebetween. The pivot screw 154 and internally threaded not 154a may be tightened to further prevent unwanted motion of the arm 140 relative to the frame 110, but of course not so tight that a wearer cannot move the frame 110 and arms 140. The same press fit engagement may be possible between the hinge element arm engaging portion 164 and the hinge receiving channel 141, which may be also be tightened further using the arm pivot screws 144. Thus, at rest and under slight pressure exerted during wear, the arms 140 and frame 110 do not move relative to each other and a wearer's view is consistent.

Although the glasses 100 described herein have been described with spring elements, these elements are not required and thus removal of the frame biasing spring receiving hole 181, frame biasing spring 191, tooth engaging pin 192, arm biasing spring receiving holes 185, arm biasing springs 186, a cam engaging pin 187, and teeth 162a, as well as the cam shapes on either of the hinge element arm engagement portion 164 and frame engagement portion 162 are not necessary to achieve the functionality of moving the arms 140 relative to the frames 110 between the traditional, folded, and lorgnette configurations. For simplicity of manufacture, in fact, such configurations may be advantageous. Furthermore, it should be appreciated that only some of these may be removed (such as those elements in the arm) while others may be retained.

At this point, one feature of the glasses 100 may be appreciated. Looking at FIG. 5, the glasses 100 may be worn in a hybrid configuration 500. This may occur when a wearer wants to look over the glasses 100 and/or down below at something they are reading. Further, it is possible to adjust the frame 110 relative to the arms 140 while the wearer is wearing the glasses, that is, it is not necessary to remove the glasses 100 to adjust the angle of the lenses 120 to the wearer's eyes.

Returning to the details of the eyeglasses 100, the tooth engaging pin 192 may have a slightly larger head than its corresponding pin body, and this head pushes against the frame biasing spring 191 and also is stopped by a frame shelf 194 within the frame 110.

For traditional arm and frame engagement feel, the hinge element arm engagement portion 164 may include a cam 164a. and the arms may have arm biasing spring receiving holes 185 that receive arm biasing springs 186 that bias a cam engaging pin 187 against the cam 164a such that the arms 140 have a cam-biased movement between a folded configuration 200 and an extended configuration 300 as the arms rotate about the first axis of rotation 142. Movement of the arms 140 in this way would be familiar to most eyeglass wearers.

Figure 2:
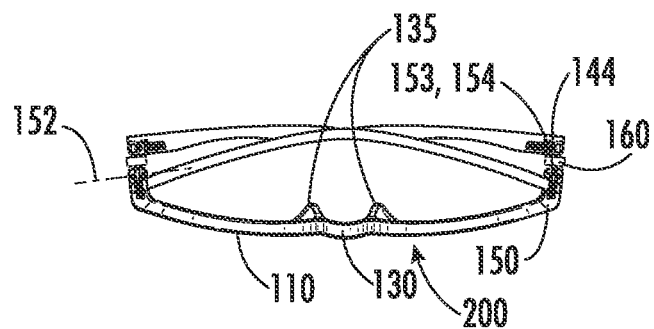
FIG. 2 shows a top view of the multiuse eyeglasses in the traditional folded position.

Due to arrangement of the parts as discussed herein, the arms 140 may not move upwards from that shown in FIG. 2 or outwards away from the lenses 120 further than that shown in FIG. 4.

FIGS. 12A, 12B, 12C, 13, 14A, 14B, 15A, 15B, 15C, and 15D show an alternate arrangement of the eyeglasses 900 that allows for movement between the traditional and lorgnette positions as previously described. The eyeglasses have familiar features of frames 910, arms 940 and lenses 920 separated by the bridge 930. The arm 940 rotates to its folded form around the arm pivot screw 944 that engages an arm extension 950 (itself engaged to the arm 940) to the hinge element 960, in an arrangement to be described in detail below.

Figure 13:
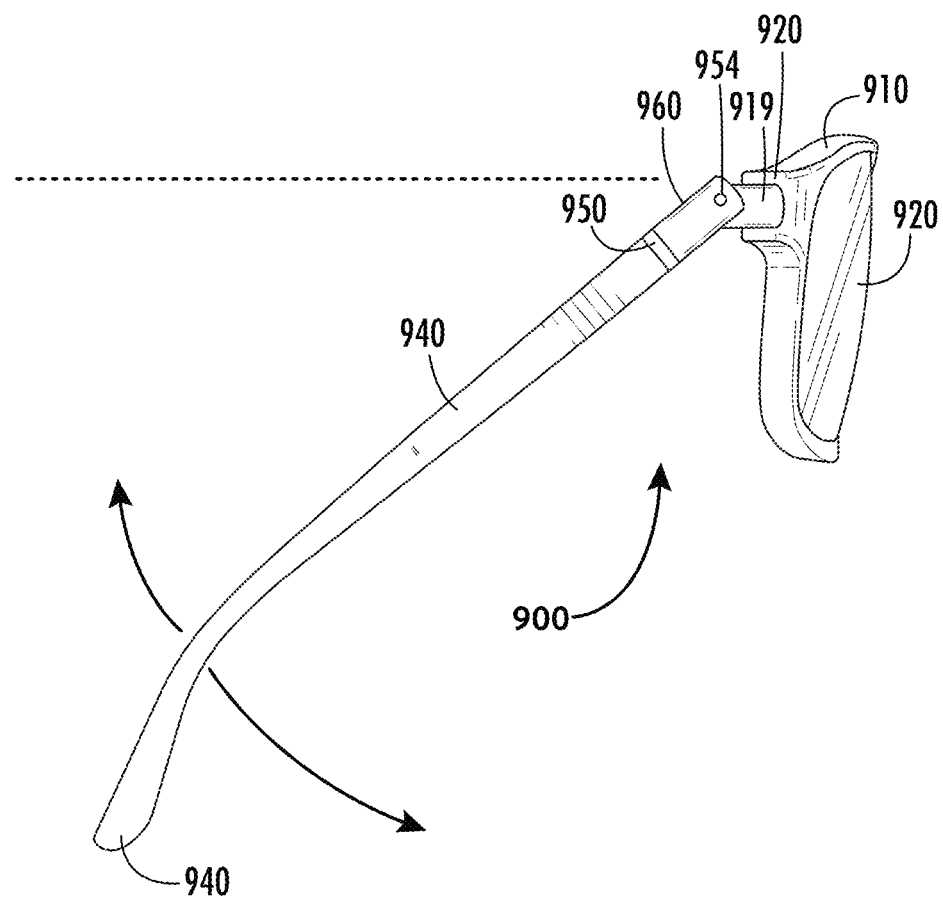
FIG. 13 shows a side view of the alternate embodiment eyeglasses at an intermediate position between the traditional and lorgnette positions.

FIG. 13 shows a side view of the glasses with the arm 940 moving between a traditional and lorgnette configuration. The arm 940 moves about frame pivot screw 954 the joins the hinge element 960 to a frame extension 919, which itself engages the frame 910. FIGS. 14A, 14B, 15A, 15B, 15C, and 15D further show the attachment, movement, and engagement of these components.

Moving from the frame 910 backwards towards the arm 940, the parts may be linked and engaged as follow. The frame 920 includes a frame extension slot 921 shaped to receive the frame engagement portion 919a of the frame extension 919 through a frame screw 910a. The frame screw 910a passes through a frame hole 911 and into a threaded frame extension hole 919c. The frame extension slot 921 may be formed in the frame 920 and a further frame extension inset 921a receives a hinge element engagement portion 919b of the frame extension 919, such that the hinge engagement portion 919b is flush with a frame 920 front corner 920a.

The hinge element portion 919b of the frame extension 919 is engaged in a frame extension gap 962 of the hinge element 960 through the pivot screw 954 that may include an unthreaded portion along its length to encourage pivoting thereabout. The pivot screw 954 passes through hinge element pivot hole 964a (which may be beveled) through frame extension hinge hole 919d and into a threaded hinge element pivot hole 964b, which may include threading to receive the pivot screw 954.

The hinge element 960 includes within its gap 962 a threaded bearing holder 966 that has a threaded portion 966a and bearing holding portion 966b. The threaded portion 966a engages a receiving hole 967 in the hinge element 960 to secure the pieces to one another, though adhesive or other engagement is possible. The bearing holder 966 includes a bearing holding portion 966b with a rounded face that receives a bearing 966c. The bearing is sized with no clearance in the gap 962 such that its movement within the gap is restricted by the gap walls 962a and bearing holding portion 966b, as well as in spaces 919f shaped to hold the bearing 966c. The bearing also may be pressed against teeth 919e during movement between the positions. The tolerances between the bearing 966c, bearing holding portion 966b, and spaces/teeth may be such that slight movement is possible therebetween such that the bearing may provide an audible click and hold as the bearing 966b settles into the spaces 919f, 919g. As shown in the enlargement in FIG. 15B, there may be two positions of easiest use because the bearing is in the holding position: A traditional wearing use where the bearing 966b is in the top space 919f and a lorgnette configuration where the bearing 966b is in the bottom space 919g.

In place of the bearing as a biasing mechanism, a spring/pin may be embedded within the hinge element gap 962 or alternately the biasing mechanism may be located on the frame extension. Or there may be a cam engagement on the frame extension similar to the cam as described with the arm extension.

The hinge element 960 engages the arm engagement extension 950 through the arm pivot screw 944 that passes through hinge arm hole 968a (which may be beveled), arm engagement extension hole 952 and threads into hinge arm hole 968b. The arm pivot screw may be of a type similar to frame pivot screw 954 with a threaded portion for engagement and a smooth portion that the arm extension hole 952 engages. The arm extension hole extends through the arm extension tab 953 that is rounded for easy movement in a arm extension gap 969c in the hinge element 960. The gap 969c is not square along its length as shown in FIG. 14B it has a rounded form to accept the movement of the arm extension tab 953 therein.

Figure 14A:
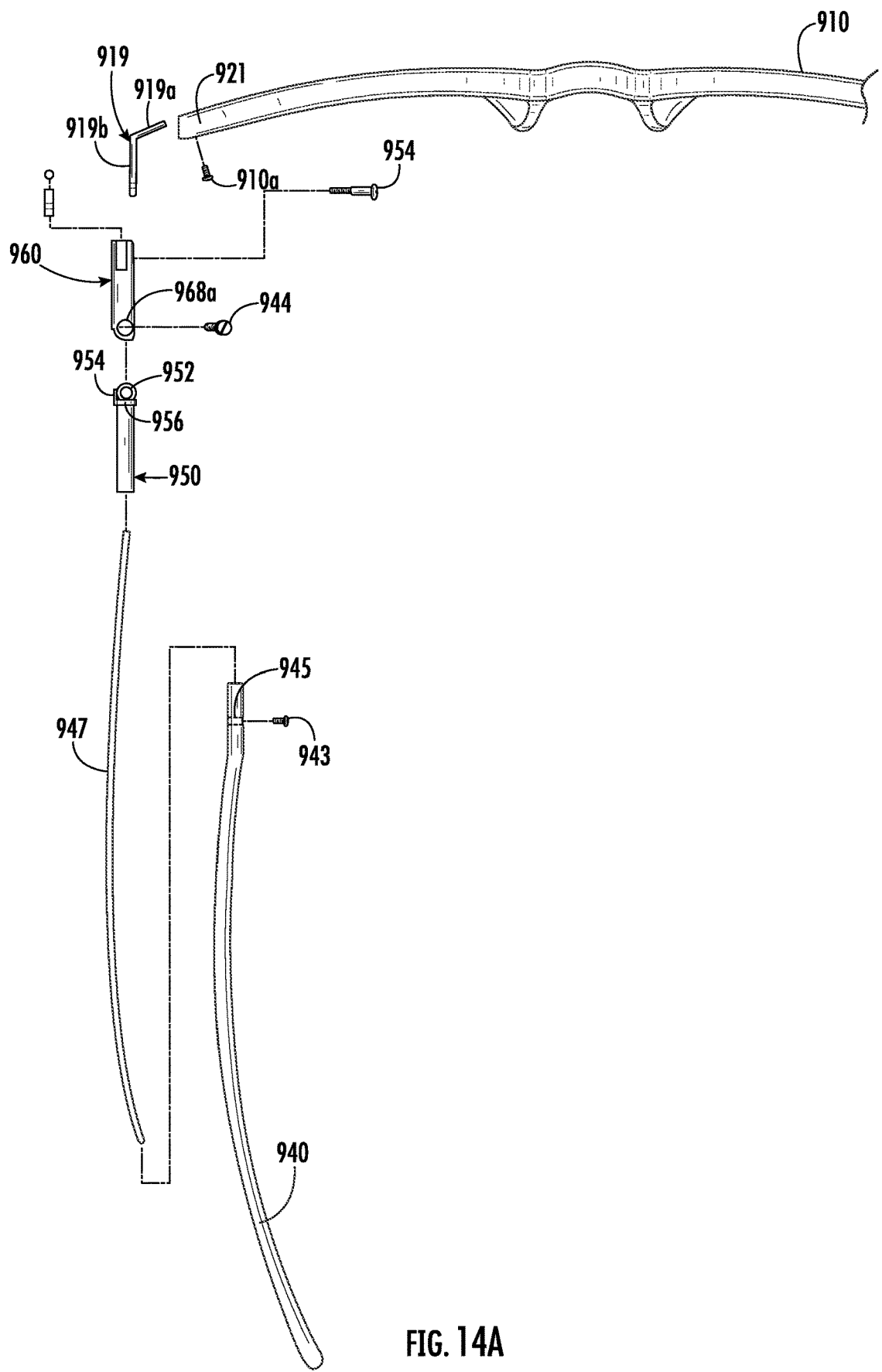
FIG. 14A is a top exploded view of the alternate embodiment eyeglasses and FIG. 14B shows a cross section through 14B,14B shown in FIG. 15A through the hinge element thereof.
Figure 14B:
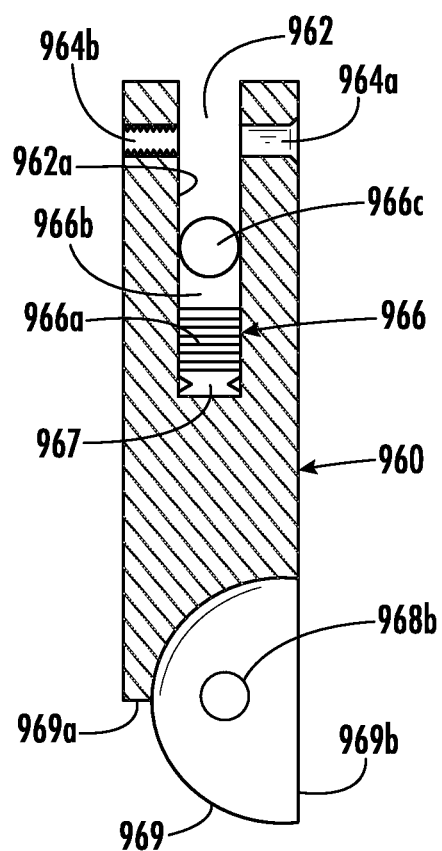

FIGS. 12B and 12C, in conjunction with FIGS. 14A and 14B show how the arm 940 and arm engagement extension 950, which are connected, rotate about the hinge element 960. The hinge element 960 has a cam 969 thereon. In the traditional configuration shown in FIG. 12B, the arm extension first leg 954 and hinge element shelf 969a are engaged to one another to prevent unwanted outward movement and the arm extension second leg 956 is engaged to a more flattened portion 969b of the cam 969. When the glasses are to be folded, the arm 940 and arm extension 950 rotate about the arm pivot screw 944 such that the second leg 956 engages the hinge element face 969b and stops is folding motion. The cam and legs engagement resists movement between the worn and folded configurations to prevent unwanted movement between the motions, that is, some force is required for this movement, similar to the force required to move between the traditional and lorgnette configurations.

The arm extension 950 includes an elongated portion 958 that fits within an arm channel 942. An arm set screw 943 engages the arm extension 940 to the arm 940 via a threaded hole 945 in the arm, which hole 945 may be beveled. The arm elongated portion 958 may be hollow to receive a fitment wire 947 that runs through a fitment channel 949 in the arm 940. This fitment wire 947 helps hold the arm in place for proper fit on the wearer.

The arm extensions and frame extensions engage the hinge elements through tab-gap alignment and fasteners. The tabs and gaps can be reversed (with the tabs on the hinge element) or other engagements that allow pivotal engagement are possible without the gap engagement.

Elements such as the frame extension 919, hinge element 964 and arm extension 950 may be made from aluminum, stainless steel, titanium or other corrosion resistant metals that can withstand repetitive use cycles. The combination of plastic parts (which could be metallic as well) in the frames and arms with these metallic pieces may increase longevity in glasses, and in particular higher end prescription glasses where longevity is more sought after.

The figures show a single style of eyeglasses, but it should be clear that metal frames, frames with different shapes, and other material choices would be possible. Further, this design may have particular advantages in sunglasses, where the user may want to lower the frames in the hybrid configuration while wearing them in order to read their phone or see something in a darker space.

Certain figures show features not to scale for sake of clarity, it being understood that the features are properly scaled in practice such that the eyeglasses described herein look traditional when work or folded in their traditional styles.

While the invention has been described with reference to the embodiments above, a person of ordinary skill in the art would understand that various changes or modifications may be made thereto without departing from the scope of the claims.

The invention claimed is:

1. Multiuse eyeglasses comprising:
a frame that holds two lenses; and
arms that extend from the frame, each arm having a first axis of rotation that is generally perpendicular to each arm and a second axis of rotation that is orthogonal to the first axis of rotation and allows each arm to be rotated downwards relative to the frame, wherein positions about the second axis of rotation are possible between a traditional configuration for traditional eyeglass wear and a configuration with the arms rotated downwards;
hinge elements between the frame and arms that join the frame to the arms, wherein the hinge elements receive an arm pivot fastener that defines the first axis of rotation and a frame pivot fastener that defines the second axis of rotation,
arm extensions engaged to the arms and hinge elements through the arm pivot fasteners; and
frame extensions engaged to the frame and hinge elements through the frame pivot fasteners,
wherein the hinge elements include a frame element gap that receives the frame extensions, the frame pivot fasteners pass through the frame extensions and the hinge elements, and the hinge elements include threaded bearing holders that hold bearings against the frame extensions.

2. The multiuse eyeglasses of claim 1, wherein the hinge elements include an arm element gap that receives the arm extensions.

3. The multiuse eyeglasses of claim 2, wherein the arm pivot fasteners pass through the arm extensions and hinge element.

4. The multiuse eyeglasses of claim 1, wherein the hinge elements include spaces shaped to engage the bearing.

5. The multiuse eyeglasses of claim 4, wherein the hinge elements include teeth between the spaces, wherein as the bearing is engaged in the spaces, the arms are held in place.

6. The multiuse eyeglasses of claim 1, wherein the frame extensions include frame engagement portions that are engaged with the frame.

7. The multiuse eyeglasses of claim 6, wherein the frame includes a frame extension slot that receive the frame engagement portions.

8. The multiuse eyeglasses of claim 7, further comprising a frame screw that joins the frame engagement portions to the frame.

9. The multiuse eyeglasses of claim 1, wherein at least one of the hinge elements, arm extensions, and frame extensions is made from a different material than the frame and arms.

10. The multiuse eyeglasses of claim 9, wherein each of the hinge elements, arm extensions, and frame extensions are predominantly a metallic material.

11. The multiuse eyeglasses of claim 10, wherein the hinge elements comprise a frame engagement portion that engages the frame and an arm engagement portion that engages the arms.

* * * * *